Patented Apr. 27, 1954

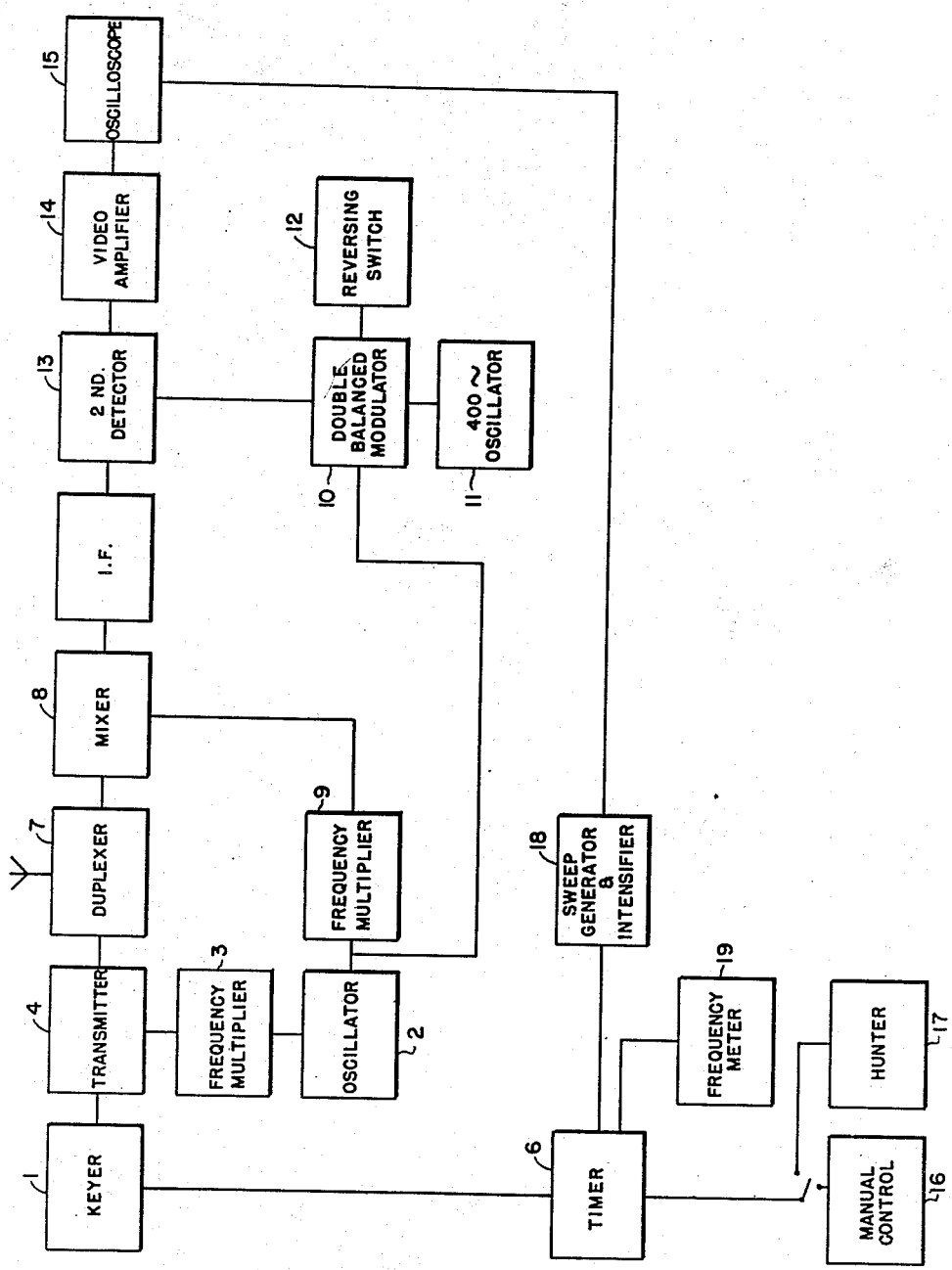

2,677,126

UNITED STATES PATENT OFFICE 2,677,126

WAVE SIGNALING SYSTEM

Harold D. Webb, Urbana, Ill., assignor to the United States of America as represented by the Secretary of the Army Application June 26, 1950, Serial No. 170,438

6 Claims. (Cl. 343—8)

(Granted under Title 35, U. S. Code (1952), sec. 266)

The invention described herein may be manufactured and used by or for the Government for governmental purposes, without the payment of any royalty thereon.

This invention relates to wave signaling systems and, more particularly, to a radio echo object locating system, in which the presence of the object having relative movement with respect to the transmitter is indicated by a Doppler shift in the frequency of the reflected energy.

A limitation to the sensitivity of any receiver system is the minimum noise level. If a carrier modulated signal is to be amplified or displayed on a cathode ray tube indicator, it must not be less than a minimum voltage level with respect to the noise. Consequently, it has been necessary in radio object locating systems to increase the transmitted power in order to raise the received signal to this minimum voltage level.

It is, therefore, an object of this invention to provide a means for decreasing the minimum detectable signal to avoid the above and other limitations of the prior art.

It is a further object to provide a means in a Doppler radio object locating system for selecting and amplifying a particular target echo and for determining its velocity.

In accordance with the present invention, in a pulsed Doppler radar system having a source of wave energy of reference frequency for producing coherence in phase of the carrier wave of radiated pulses, means are provided for varying the pulse repetition rate relative to a chosen medial pulse rate. Also provided are means operatively controlled by the source of wave energy of reference frequency for converting echo pulses received from a moving target to pulses of wave energy having the frequency of the medial rate modified by a Doppler frequency resulting from the radial velocity of the moving target and means for displaying the converted pulses to provide thereby a means for observing an adjustment of the pulse repetition rate to equal the frequency of the medial rate as modified by the Doppler frequency, whereby the reception sensitivity of the system is improved for echo pulses from the particular target and the radial velocity of the particular target is determined by the amount and sense of the change of the pulse rate from its medial rate.

For a better understanding of the present invention, together with other and further objects thereof, reference is had to the following description taken in connection with the accompanying drawing and its scope will be pointed out in the appended claims.

Referring to the drawing, Fig. 1, which is a block diagram of the preferred embodiment of the invention, there is shown a crystal controlled oscillator 2 which is used to supply the basic frequency for the system. This frequency is 17 megacycles. An output is sent to a frequency multiplier 3 which, in this embodiment, multiplies the 17 megacycles signal by a factor of six to produce a carrier frequency of 102 megacycles. This signal is then amplified in the transmitter 4. The transmitter is turned on periodically by keyer 5 which is controlled by the timer 6. Thus, there are radiated time spaced pulses of radio frequency energy. The reflected energy, which is received by the common transmitting and receiving antenna, is translated by a duplexer 7 to the mixer 8. Another frequency multiplier 9 multiplies the output of the crystal controlled oscillator by a factor of 7 to provide a local beating frequency for the mixer. The resulting output of the mixer is an intermediate frequency of 17 megacycles plus or minus the Doppler frequency component depending upon whether the target velocity is toward or away from the station. Part of the crystal controlled oscillator output is also combined in the double balanced modulator 10 with the output of an audio oscillator 11 to provide a frequency of 17 megacycles plus or minus the audio frequency of 400 cycles per second, depending upon position of the phase reversing switch 12. This frequency is combined with the output of the I. F. amplifier in the second detector 13 and the video component is then amplified in the video amplifier 14. The video component will therefore be 400 cycles plus or minus the Doppler frequency. The video component is then applied to the vertical deflection plates of a cathode ray tube 15. The timing oscillator 6 is adjustable to produce an output frequency varying from 250 to 550 cycles per second. This adjustment can be made by means of manual control 16, or automatically, by means of hunter 17 which will slowly vary the frequency over the range. The timer output frequency is also used to provide a synchronizing signal for the sweep generator and beam intensifier 18. Inasmuch as all the components shown in block form are conventional and well known in the art, it is believed that a detailed explanation of the circuits is unnecessary.

The operation of the system will now be explained. It has been found that the injection of a coherent or phased-in signal of equal frequency in the detector of a Doppler radar system will give an improvement in the signal-to-noise ratio of approximately 6 to 10 db. It has further been found that if the coherent signal differs from the received Doppler shifted signal by more than a few cycles that there is little or no improvement. Since the received frequency will vary depending upon the speed of the target, means must be provided for varying the coherent signal. In the present embodiment, which uses a transmitted radio frequency of 102 megacycles, and estimating a target velocity not in excess of 450 miles per hour, the range of possible Doppler frequencies is between zero and 150 cycles per second. For higher radio frequencies and target frequencies, this range will of course be correspondingly greater. In order to insure that the coherent signal is phased-in, a common base frequency is provided by cyrstal controlled oscillator 2. The transmitted frequency is derived therefrom by means of a frequency multiplier. The coherent signal is provided by combining the output of an audio oscillator 11 with the output of the crystal controlled oscillator 2. The output frequency of the crystal controlled oscillator is also the intermediate frequency of 17 megacycles. The output of the fixed audio oscillator is a 400 cycle signal. This frequency was chosen to provide a difference frequency between it and the Doppler frequency which is within the range of frequency output of a variable oscillator and within the desirable range of pulse repetition rates.

It has been found that by varying the timing oscillator and, consequently, the rate of pulsing the transmitter, to equal the sum or the difference between the Doppler frequency and the audio oscillator frequency, coherence can be obtained. To cover the range of frequencies it is therefore necessary that the timing oscillator be continuously variable from 250 to 550 cycles per second in order to provide coherence for Doppler frequencies extending from zero to plus or minus 150 cycles. In order to automatically scan the entire range, the hunter 17, which is a slowly varying oscillator, is turned on. This variation is slow enough so that a signal which cannot be seen without the coherent signal will be visible for a reasonable length of time. The hunter may then be stopped and the desired signal tracked by keeping it in phase with the manual control. The timer frequency can be fed directly to a frequency meter 19 which may be calibrated in miles per hour to give an indication of target speed.

The reason that coherence with the Doppler shifted waves is achieved will be clear by considering the heterodyne beats produced at the input to second detector 13. The two input waves are of frequency of 17 megacycles plus or minus $F_d$ from the I. F. amplifier and 17 megacycles plus or minus 400 cycles from the double balanced modulator 10. Here, $F_d$ denotes the Doppler frequency and the sign depends on the radial velocity of the target toward or away from the radar station. If it is assumed that the I. F. signal wave is not pulses, but continuous, then there would be beats between these two waves at a frequency of 400 cycles plus or minus $F_d$. The maxima of the beats would occur at the time intervals when the two waves add. During these intervals of addition the two waves are considered to be in phase.

Since, however, the incoming wave and, therefore, the I. F. signal wave is pulsed but is still coherently related to the 17 megacycle reference wave from oscillator 2, the same beat phenomenon occurs, but only during the pulsed intervals when the incoming wave is present. If, now, the pulsing rate of timer 6 is changed from a center or medial reference rate of 400 pulses per second to the rate of 400 plus or minus the Doppler frequency, then the incoming coherent wave will be present at the time intervals during which the beat maxima occur. Under this condition the output of detector 13 is a maximum and the Doppler frequency and its sign may be determined via the meter 19 by noting the change in the pulsing rate relative to the medial value of 400 cycles.

While there has been described what are at present considered to be the preferred embodiments of this invention, it will be obvious to those skilled in the art that various changes and modifications may be made therein without departing from the invention, and it is, therefore, aimed in the appended claims to cover all such changes and modifications as fall within the true spirit and scope of the invention.

I claim:

1. In a pulsed Doppler radar system having a source of wave energy of reference frequency for producing coherence in phase of the carrier wave of radiated pulses; means for varying the pulse repetition rate relative to a chosen medial pulse rate, means operatively controlled by said source for converting echo pulses received from a moving target to pulses of wave energy having the frequency of said medial rate modified by a Doppler frequency resulting from the radial velocity of said moving target and means for displaying said converted pulses to provide thereby a means for observing an adjustment of the pulse repetition rate to equal said frequency of said medial rate modified by said Doppler frequency whereby the reception sensitivity of the system is improved for echo pulses from said particular target and the radial velocity of the particular target is determined by the amount and sense of the change of the pulse rate from said medial rate.

2. In a pulsed Doppler radar system having a source of wave energy of reference frequency for producing coherence in phase of the carrier wave of radiated pulses; means for manually varying the pulse repetition rate relative to a chosen medial pulse rate, means operatively controlled by said source for converting received echo pulses to pulses of wave energy of a frequency which equals said medial rate modified by the Doppler frequencies resulting from the radial velocity of moving targets and means for displaying said converted pulses to provide thereby a means for observing an adjustment of the pulse repetition rate to a rate equal to the frequency of said medial rate modified by the Doppler frequency of echo pulses returned from particular targets of one radial velocity whereby the reception sensitivity of the system is improved for echo pulses from said particular targets and the radial velocity of the particular targets is determined by the amount and sense of the change of the pulse rate from said medial rate.

3. A system in accordance with claim 2 which further comprises alternative means for varying the pulse repetition rate continuously back and forth through a range relative to said chosen medial rate, sequentially to provide increased receiver sensitivity for and indications of target echoes of different radial velocities.

4. In a pulsed Doppler radar system having a source of wave energy of reference frequency for producing coherence in phase of the carrier wave of radiated pulses; means for manually varying the pulse repetition rate relative to a chosen medial pulse rate, a second source of wave energy of frequency equal to said medial rate, means operatively controlled by said two sources for converting received echo pulses to pulses of wave energy of a frequency which equals said medial rate modified by the Doppler frequencies resulting from the radial velocity of moving targets and means for displaying said converted pulses to provide thereby a means for observing an adjustment of the pulse repetition rate to a rate equal to the frequency of said medial rate modified by the Doppler frequency of echo pulses returned from particular targets of one radial velocity whereby the reception sensitivity of the system is improved for echo pulses from said particular targets and the radial velocity of the particular targets is determined by the amount and sense of the change of the pulse rate from said medial rate.

5. In a pulsed Doppler radar system having a source of wave energy of reference frequency for producing coherence in phase of the carrier wave of radiated pulses; means for manually varying the pulse repetition rate relative to a chosen medial pulse rate, means operatively controlled by said source for converting received echo pulses to pulses of wave energy of frequencies which equal said reference frequency modified by the Doppler frequencies resulting from the radial velocity of moving targets, a second source of wave energy of frequency equal to said medial rate, means operatively controlled by said source and said second source for converting said converted pulses to pulses of wave energy of frequencies which equals said medial rate modified by the said Doppler frequencies, and means for again displaying said again converted pulses to provide thereby a means for observing an adjustment of the pulse repetition rate to a rate equal to the frequency of said medial rate modified by the Doppler frequency of echo pulses returned from particular targets of one radial velocity whereby the reception sensitivity of the system is improved for echo pulses from said particular targets and the radial velocity of the particular targets is determined by the amount and sense of the change of the pulse rate from said medial rate.

6. A system in accordance with claim 5 which further comprises alternative means for varying the pulse repetition rate continuously back and forth through a range relative to said chosen medial rate, sequentially to provide increased receiver sensitivity for and indications of target echoes of different radial velocities.

References Cited in the file of this patent

UNITED STATES PATENTS

| Number | Name | Date |
|---|---|---|
| 2,479,568 | Hansen | Aug. 23, 1949 |
| 2,485,583 | Ginzton | Oct. 25, 1949 |
| 2,491,542 | Woodyard et al. | Dec. 20, 1949 |
| 2,535,274 | Dicke | Dec. 26, 1950 |
| 2,543,448 | Emslie | Feb. 27, 1951 |
| 2,543,449 | Emslie | Feb. 27, 1951 |

FOREIGN PATENTS

| Number | Country | Date |
|---|---|---|
| 625,034 | Great Britain | June 21, 1949 |